W. B. ALLEN.
Grain-Separators.

No. 135,746. Patented Feb. 11, 1873.

Witnesses:
Wm. J. Peyton.
A. H. Norris.

Inventor
Wm. B. Allen.
by
James L. Norris,
Attorney.

UNITED STATES PATENT OFFICE.

WILLIAM B. ALLEN, OF WINONA, MINNESOTA.

IMPROVEMENT IN GRAIN-SEPARATORS.

Specification forming part of Letters Patent No. 135,746, dated February 11, 1873.

*To all whom it may concern:*

Be it known that I, WILLIAM B. ALLEN, of Winona, Winona county and State of Minnesota, have invented certain Improvements in Grain-Separators, of which the following is a specification:

The first part of my invention relates to the combination of a rotary cylinder with a zigzag cam at one of its ends and its surface covered with one or more thicknesses of soft cloth or leather, or their equivalents, and one or more flexible metallic sieves pressed against its outer surface and held in place by elastic straps or springs in such a manner that when the cylinder is set in motion and the grain introduced between the surface of the covered cylinder and the flexible sieve the grain will be rubbed against the sieve, and, as the first part of the sieve is perforated with small perforations, the cockle will pass through the perforations and the grain will be retained, and by the motion of the cylinder will be carried on to where the sieve has larger perforations, which will let the wheat pass through; but as the pressure of the sieve against the surface of the cylinder prevents the oats and other long grains from turning upon their ends they cannot pass through the perforations for wheat, but will be carried on still further by the motion of the cylinder and pass off at the extreme end of the sieve, and in this manner each kind of grain is separated from the other.

Figure 1:
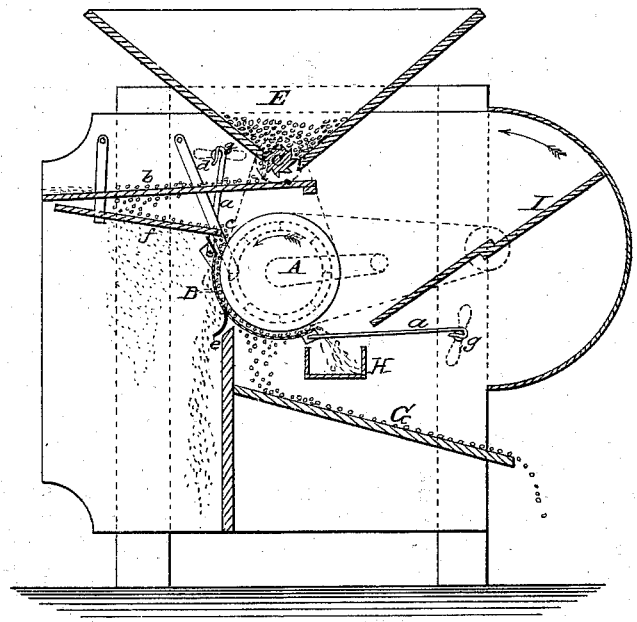
Figure 2:
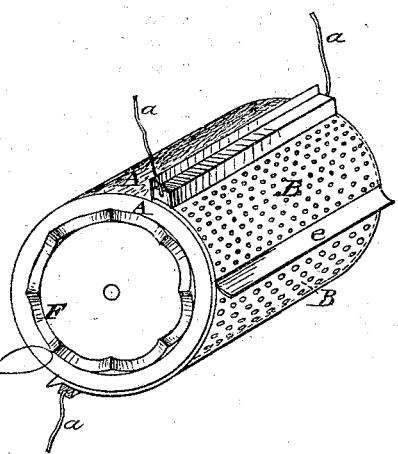

Figure 1 is plan of a machine embodying my invention. Fig. 2 is an enlarged elevation of the rotary cylinder and flexible sieve.

A is the rotary cylinder. B B is the flexible metallic sieve, which is held in place against the surface of the cylinder A by the elastic straps $a\ a$, each elastic strap having one of its ends fast to a corner of a sieve, B B, and its other end fastened to a revolving pin or thumbkey, $g$, by which the operator is enabled to keep the sieve B B in its proper position, and still leave it perfectly flexible and at liberty to adjust itself to the surface of the cylinder A. E is the hopper, with the feed-roller C in the opening at its bottom. When the grain is placed in the hopper it is carried down at the bottom and emptied evenly upon the sieve $b$ by the revolving feed-roller C. The flat sieve $b$, having large perforations, allows all the grain to pass through and fall upon the flat sieve $f$. The straws and light stuff are carried off by the current of air from the fan I. The fine sieve $f$ lets all the grass-seeds through, and carries the grain along and empties it off its end at $c$, where it passes between the surface of the cylinder A and the flexible sieve B B, the first part of the sieve B B being perforated with small holes of proper size to let the cockle-seed pass out through them and still retain the wheat and other larger grains. These, by the motion of the cylinder A, are carried onto the latter portion of the sieve B B, which is perforated with larger holes, through which the wheat passes and falls onto the board G, down which it passes out of the machine. The oats and other long grains, being held down flatwise by the pressure between the sieve B B and cylinder A, cannot pass through the holes of the proper size for the wheat, and are carried on and emptied into the trough H, which allows the oats to be emptied out at one side of the machine. On the end of the cylinder A, shown in Fig. 2, is a zigzag cam, F, which is represented in Fig. 1 by dotted lines. This cam comes in contact with the lever or arm $d$ shown in Fig. 1, which is fast to the sieves $b$ and $f$, and is set in motion by coming in contact with the cam F, and gives the sieves $b$ and $f$ the desired vibrating motion.

I make no claim to the metallic sieve, as such, for I am aware that it has been known and used; nor do I claim the fan I or straight sieves $b$ and $f$, or the manner of their arrangement, for I am aware that these are not new; but

I claim as my invention—

The combination of the cylinder A having at one of its ends the zigzag cam F and its outer surface covered with one or more thicknesses of soft cloth or leather, or their equivalent, and the flexible sieve B B, with its elastic straps or springs $a\ a$, substantially as and for the purpose hereinbefore set forth.

WILLIAM B. ALLEN.

Witnesses:
 NORMAN BUCK,
 ALEX. McNIL.